United States Patent Office 3,235,362
Patented Feb. 15, 1966

3,235,362
METHOD FOR THE CONTROL OF WEEDS
Linus M. Ellis, Wilmington, Del., assignor to E. I. du Pont de Nemours and Company, Wilmington, Del., a corporation of Delaware
No Drawing. Filed June 26, 1963, Ser. No. 290,611
8 Claims. (Cl. 71—2.5)

This application is a continuation-in-part of application Serial No. 783,684, filed December 30, 1958, and Serial No. 12,968, filed March 7, 1960, and copending application Serial No. 148,819, filed October 31, 1961, all of which are now abandoned.

This invention relates to the use of 3,6-substituted uracils and derivatives of these uracils as herbicides.

It is more particularly directed to herbicidal compositions and methods employing, as an active ingredient, at least one compound of the formula (1)
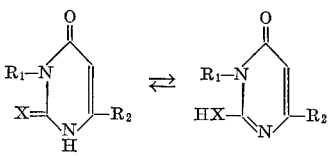

where $R_1$ is an alkyl radical of 3 through 6 carbon atoms;
$R_2$ is an alkyl radical of 1 through 6 carbon atoms; and
X is oxygen or sulfur.

The salts of these compounds can also be used according to this invention. By "salts" is meant those compounds formed with such cations as sodium, potassium, lithium, calcium, magnesium, barium, strontium, iron, manganese and quaternary ammonium.

Some of the uracils of Formula 1 also form novel 1:1 addition compounds with nitrogenous bases. The exact structure of these compounds is not known. Although the compounds are, generally speaking, poorly soluble in water, they are, according to the best available information, believed to be essentially salt-like in structure. They will be symbolized by the following formula, with the understanding that it is representative only, and is not intended to illustrate actual structure:

(2)
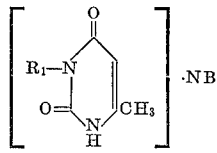

where:

$R_1$ is defined as in Formula 1,
and
NB is a nitrogenous base having an ionization constant $K_b$ of $10^{-9}$ in water.

Suitable nitrogenous bases are substituted, unsubstituted, cyclic and acyclic

Amines,
Amidines, and
Guanidines

The amines can be primary, secondary or tertiary amines, polyamines, arylamines, or heterocycloamines. Illustrative of such amines are:

Sec-butylamine
2-amino-2-methyl-1,3-propanediol
Trimethylenediamine
Ethanolamine
Dodecylamine
Ethylenediamine
Hexamethylenediamine
Cocoadiamine
Tallowdiamine
Hexamethyleneimine
Cyclohexylamine
Methoxypropylamine
Methylamine
Dimethylamine
Trimethylamine
Ammonia
Ethylamine
Propylamine
Butylamine
Octylamine
Pyridine
Piperidine
Tetramethylguanidine
Acetamidine
Benzylamine
Diethylenediamine
2-aminobutanol-1
2-aminooctanol-1

The uracils of Formula 1 also form water stable, novel complexes with phenol and substituted phenols. These complexes have the formula (3)
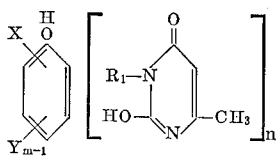

where:

$R_1$ is as defined in Formula 1,
X is hydrogen, chlorine, nitro, alkyl of 1 through 3 carbon atoms, bromine or—$OR_3$ where $R_3$ is alkyl of 1 through 3 carbon atoms,
Y is chlorine or alkyl of 1 through 3 carbon atoms,
m is a number 1 through 5, and
n is 1 or 2.

These complexes are also herbicidal, and in this respect, have some advantages over the uracils per se, viz., higher solubility in oils and solvents. They are formulated into herbicidal compositions in the same way as are the uracils themselves.

UTILITY

These uracils represent a new class of herbicides offering farmers and property owners a new and effective method for control of undesirable vegetation.

Used in pre-emergence treatments, these compounds control such germinating broadleaf weeds as pigweed, lambs quarter, mustard, chickweed and ragweed, and such grass weeds as crabgrass, watergrass, giant foxtail and seedling Johnson grass.

Soil foliage applications of these compounds control such mixed annual and perennial species as quackgrass, Johnson grass, broomsedge, oxeye daisy, barnyard grass and foxtail.

These properties make the compounds useful wherever general weed control is required. They can be used, for example, to control weeds in industrial areas, railroad rights-of-way, and in areas adjacent to croplands.

The precise amount to be used in any given situation will, of course, vary according to the particular result desired, the plant and soil involved, the formulation used, the mode of applications, prevailing weather conditions, foliage density, and like factors. Because so many variables play a role, it is not possible to indicate a rate of application suitable for all situations. Broadly speaking, the compounds are used, in pre-emergence applications, at levels of about 0.5 to 5 pounds per acre. In soil-foliage applications, rates of 20 to 80 pounds per acre will generally be used. More can be used to control difficult-to-kill species growing under adverse conditions. Economic factors, such as inaccessibility of the area to be treated, e.g., fire breaks in forests, may also favor higher rates, with less frequent treatments.

Of the compounds of Formula 1, those in which $R_1$ is an alkyl group containing 3 or 4 carbon atoms are preferred for this use.

These uracils can also be used as starting materials for the preparation of 3,5,6-substituted uracils, which are herbicidal in their own right. Details regarding preparation of these compounds, using the uracils of this invention as reactants, are found in copending application Serial No. 217,521, filed August 17, 1962.

PREPARATION OF COMPOUNDS

The uracils of Formula 1 can be prepared according to the following equations:

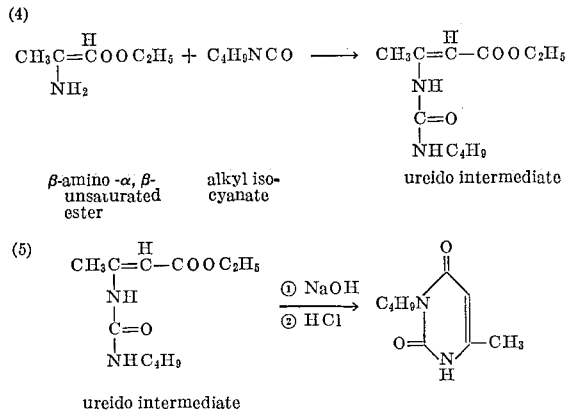

The β-amino-α,β-unsaturated ester starting material in Equation 2 can be prepared by reacting a corresponding β-keto-ester with aqueous ammonia. This is described in Ber., 20, 3054 (1887).

According to Equations 2 and 3, equimolar portions of a properly substituted β-amino-α,β-unsaturated ester and an alkyl isocyanate or isothiocyanate are mixed in an inert solvent such as toluene or xylene. This mixture is then heated for a short time at reflux temperature.

The reaction mixture is then chilled, filtered, and the filtrate distilled to remove the solvent. Generally, a viscous liquid residue of crude β-(3-substituted ureido)-α,β-unsaturated ester remains. This can be reacted without further purification with an aqueous alcoholic alkaline solution at reflux temperature to bring about uracil ring closure.

At this point, the reaction is made acidic with a strong acid such as hydrochloric and distilled to remove the alcohol. Upon chilling the remaining aqueous residue, the uracil separates out of solution as an essentially pure solid.

This method is described in Ann., 314, 219 (1901) and Ber., 33, 622 (1900).

An alternate method for preparing these uracils is illustrated by the following equations:

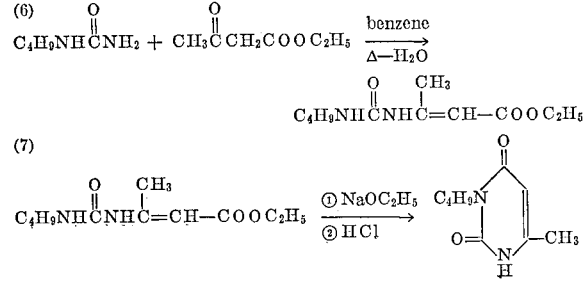

In this method, an appropriately substituted urea or thiourea is reacted with a β-keto ester and an acid catalyst at reflux temperature in a solvent from which water is removed continuously. After all the water has been removed, the solution is stripped and the residue taken up in ethanol containing a base such as sodium methoxide. After a few minutes of refluxing, the solvent is removed and the residual oil is taken up in water and acidified, whereupon the product separates in crystalline form.

The salts of the compounds of Formula 1 can be prepared by conventional methods such as dissolving the free uracil in an aqueous or nonaqueous solution of at least an equimolar amount of a base or basic salt containing the desired cation. For example, a sodium salt can be prepared by dissolving the uracil in water containing an equimolar amount of sodium hydroxide. The salt can then be isolated from the solution by removal of the water. The uracil salts which are not soluble in water can be prepared by treating an aqueous solution of an alkali metal salt of the uracil with an aqueous solution of a water-soluble salt of the metal.

The quaternary ammonium salts of the compounds of Formula 1 can be prepared by reacting the substituted uracil with an appropriate quaternary ammonium hydroxide. Since these hydroxides are generally available in solution, the reaction is most conveniently carried out in the same solvent. If the solvent-free salt is desired, it can be easily prepared by removing the solvent.

Alternatively, the quaternary ammonium salts of the uracils can be prepared in a dry inert solvent such as toluene or xylene. The appropriate quaternary ammonium halide is then added with stirring to the sodium salt of the uracil and, if necessary, mild heating. The sodium halide which forms is removed by filtration, leaving the quaternary ammonium salt of the uracil in solution. If desired, the solvent-free salt can be prepared by removing the solvent, preferably in vacuo.

The nitrogenous base-addition compounds of Formula 2 can be prepared by mixing together equimolar quantities of an appropriate uracil and a nitrogenous base. The mixture is gradually heated, with stirring, until a clear melt is formed. On cooling, the addition compound crystallizes. This product can then be recrystallized from a solvent such as benzene, cyclohexane, nitromethane or acetonitrile.

It is sometimes advantageous to use an inert solvent medium to carry out the reaction. Such a solvent moderates the reaction by acting as a heat sink, and allows better control of the reaction, especially if it is being carried out on a large scale. Suitable inert solvents are benzene, cyclohexane, nitromethane, acetonitrile and dioxane.

When an inert solvent is used, the addition compounds can be prepared by dissolving the amine in the solvent and then adding the uracil gradually, with stirring. Stirring is continued for from ten minutes to two hours. Mild heating may be necessary. Some addition compounds precipitate and can be removed by filtration. Other addition compounds can be isolated by evaporating the solvent. The addition compounds prepared in this way are suitable for use without further purification, but can be purified by recrystallization if desired.

In some instances, the uracil and amine are highly soluble in the inert solvent, but the addition compound is not, and so it can be filtered off pure when the reaction is complete.

The complexes of Formula 3 can be formed by co-melting the uracil and phenol in a 1:1 to 2:1 (uracil: phenol) ratio. They can also be formed by codissolving the reactants, in the same ratio, in a nonpolar solvent such as nitromethane or a mixture of nitromethane and cyclohexane. Process conditions and isolation procedures are the same as those described for the addition compounds.

HERBICIDAL COMPOSITIONS

The compounds of Formulae 1 through 3 can be prepared for use by incorporating them with adjuvants. This permits their use to greatest advantage.

The amount of herbicide in such preparations can vary over a wide range according to need. Generally speaking, they will contain from about 0.5 to 95%, by weight of a uracil.

Powder and dust preparations can be made by mixing actives with finely-divided solids such as talcs, natural clays, pyrophyllite, diatomaceous earth and synthetic mineral fillers derived from silica and silicate; flours such as walnut shell, wheat, redwood, soya bean and cotton seed; or inorganic substances such as magnesium carbonate, calcium carbonate, calcium phosphate, sulfur and lime. These preparations are made by thoroughly blending the active ingredient and the solid. The particles in such preparations are preferably less than 50 microns in average diameter.

Water-soluble preparations can be prepared by mixing actives with solubilizing agents. Solid bases having a pH of at least 9.5 in a 1% aqueous solution, such as sodium or potassium phosphates, silicates, carbonates, borates, oxides or hydroxides, are suitable. The preparations can contain from 0.5 to 80% active ingredient and from 5 to 99.5% of the solubilizing agent.

Aqueous suspensions can be prepared by sandgrinding or ball milling an aqueous slurry of water-insoluble active ingredient and dispersing agent, to obtain a concentrated slurry of particles less than 5 microns in diameter. Thickening agents such as gelling type clays can be used to reduce the settling.

Granules and pellets can be made by mixing a finely-divided active with a suitable clay, moistening this mixture with from 15 to 20% by weight of water, and then extruding the mass through a suitable die under pressure. The extrusions are cut into pre-determined lengths and then dried. These pellets can be granulated if desired.

Granules or pellets can also be prepared by spraying a suspension or solution of an active onto the surface of a preformed granule of clay, vermiculite or other suitable granular material. If the active is in solution, it will penetrate into the pores of the granule and so will adhere without the aid of a binding agent. When the active is insoluble in the liquid and is carried as a suspension, it is preferable that a binding agent such as goulac, dextrin, swollen starch, glue or polyvinyl alcohol be added. In either case, the granule is then dried and ready for use.

The uracils of the invention can also be prepared in non-aqueous liquids. Suitable for use are hydrocarbons (substituted or unsubstituted), and non-water miscible ethers, esters, and ketones. Preferred are aromatic hydrocarbons such as xylene and ketones such as isophorone. These liquid preparations are made by milling the components in a mill such as a pebble mill until the particles have average diameters of from 1 to 50 microns, preferably 5 to 20 microns.

The herbicidal preparations, whatever physical form they take, preferably contain a surface-active agent. The surfactant renders the preparations readily dispersible in liquids and improves their action on waxy leaves and the like. For general application, surface-active agents are used in the preparations at concentrations of from about 1 to 10%, by weight. Levels of from 0.5 to 6 parts of surfactant for each part of uracil, however, give unusual and unexpected results. Preparations having these higher levels of surfactants show greater herbicidal effectiveness than can be expected from a consideration of activity of the components used separately.

The term "surface-active agent" is intended to include wetting agents, dispersing agents, suspending agents and emulsifying agents. Surface-active agents suitable for use are set forth in "Detergents and Emulsifiers—1963 Annual," John W. McCutcheon, Inc., Morristown, New Jersey. Other surface-active agents which can be used in these preparations are listed in U.S. Patents 2,139,276; 2,412,510; 2,426,417; 2,655,447; and Bulletin E–607 of the Bureau of Entomology and Plant Quarantine of the U.S. Department of Agriculture.

The preparations can also optionally contain adhesives such as gelatin, blood albumin and such resins as rosin alkyd resins to increase retention and tenacity of deposits following application. Corrosion inhibitors and antifoaming agents can also be added.

With respect to the nitrogeneous base-addition compounds of Formula 2, it has been found that preparation with polar low-molecular weight amines, such as ethanolamines, propanolamines and butanolamines gives addition compounds soluble in water, especially when the amine is present in excess. Other amines, such as piperidine and octanolamines give addition compounds which are soluble in both water (with an excess of amine present) and hydrocarbon solvents. At the other end of the scale, amines such as dodecylamines, cocoamines and tallowamines give the addition compounds high hydrocarbon solubility.

Thus, it is apparent that by properly selecting an amine and forming an addition compound with it, uracils of Formula 2 can be formulated as aqueous solutions, wettable powders, or as an oil-emulsifiable or oil-extendable formulations. In this way, the nitrogenous base-addition compounds give formulation and application advantages, while still maintaining the desirable herbicidal characteristics of the parent uracils.

FORMULATION WITH OTHER HERBICIDES

The herbicidal compositions of this invention can be formulated to contain two or more of the uracils. They can also be formulated to contain other known herbicides, in addition to the uracils, to give compositions which have advantages over the individual components.

Among the known herbicides which can be combined with the compounds of Formulae 1 through 3 are:

Substituted ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the uracils of this invention in proportions of from 1:4 to 4:1, respectively, the preferred ratio being 1:2 to 2:1.

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the uracils of this invention in proportions of from 1:4 to 4:1, respectively, the preferred ratio being 1:2 to 2:1.

Phenols

Dinitro-o-sec-butylphenol and its salts
Pentachlorophenol and its salts

These phenols can be mixed with the uracils of this invention in the proportions of 1:10 to 20:1, respectively, the preferred ratio being 1:5 to 5:1.

Carboxylic acids and derivatives

The following carboxylic acids and derivatives can be mixed with the uracils of this invention in the listed proportions:

(A)

2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2-methyl-3,6-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol Mixed in a 1:16 to 8:1 ratio, preferably a 1:4 to 4:1 ratio.

(B) 2,6-dichlorobenzonitrile

Mixed in a 1:4 to 4:1 ratio, preferably a 1:3 to 3:1 ratio.

(C) Trichloroacetic acid and its salts

Mixed in a 1:2 to 25:1 ratio, preferably a 1:1 to 8:1 ratio.

(D) 2,2-dichloropropionic acid and its salts

Mixed in a 1:4 to 8:1 ratio, preferably a 1:2 to 4:1 ratio.

(E)

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester Mixed in a 1:2 to 24:1 ratio, preferably a 1:1 to 12:1 ratio.

(F)

N-phenylcarbamic acid, isopropyl ester
N-(m-chlorophenyl)carbamic acid, isopropyl ester
N-(m-chlorophenyl)carbamic acid, 4-chloro-2-butynyl ester Mixed in a 1:2 to 24:1 ratio, preferably a 1:1 to 12:1 ratio.

(G) 2,3,6-trichlorophenylacetic acid and its salts

Mixed in a 1:12 to 8:1 ratio, preferably a 1:4 to 4:1 ratio.

(H)

2-chloro-N,N-diallylacetamide
Maleic hydrazide

Mixed in a 1:2 to 10:1 ratio, preferably a 1:1 to 5:1 ratio.

Inorganic and mixed inorganic-organic salts

The following salts can be mixed with the uracils in the listed proportions:

(A)

Calcium propylarsonate
Disodium monomethylarsonate
Octyl-dodecylammoniummethylarsonate
Dimethylarsinic acid Mixed in a 1:4 to 4:1 ratio, preferably a 1:2 to 2:1 ratio.

(B) Sodium arsenite

Mixed in a 1:5 to 40:1 ratio, preferably a 1:4 to 25:1 ratio.

(C)

Lead arsenate
Calcium arsenate

Mixed in a 150:1 to 600:1 ratio, preferably a 100:1 to 400:1 ratio.

(D)

Sodium tetraborate hydrated, granulated
Sodium metaborate
Sodium pentaborate
Polyborchlorate
Unrefined borate ore such as borascu Mixed in a 3:1 to 1500:1 ratio, preferably a 6:1 to 1000:1 ratio.

(E) Ammonium thiocyanate

Mixed in a 1:10 to 20:1 ratio, preferably a 1:5 to 5:1 ratio.

(F) Sodium chlorate

Mixed in a 1:1 to 40:1 ratio, preferably a 2:1 to 20:1 ratio.

(G) Ammonium sulfamate

Mixed in a 1:1 to 100:1 ratio, preferably a 1:1 to 50:1 ratio.

Other organic herbicides

These organic herbicides can be mixed with the uracils in the listed proportions:

(A) 5,6-dihydro-(4A,6A)-dipyrido-(1,2-A,2'1'-C)pyrazinium dibromide

Mixed in a 1:20 to 16:1 ratio, preferably a 1:5 to 5:1 ratio.

(B) 3-amino-1,2,4-triazole

Mixed in a 1:20 to 20:1 ratio, preferably a 1:5 to 5:1 ratio.

(C) 3,6-endoxohexahydrophthalic acid

Mixed in a 1:3 to 20:1 ratio, preferably a 1:2 to 10:1 ratio.

(D) Hexachloroacetone

Mixed in a 1:2 to 16:1 ratio, preferably a 1:1 to 8:1 ratio.

(E)

Diphenylacetonitrile
N,N-dimethyl-$\alpha,\alpha$-diphenylacetamide
N,N-di-n-propyl-2,6-dinitro-4-trifluoromethyl-aniline
N,N-di-n-propyl-2,6-dinitro-4-methylaniline Mixed in in a 1:10 to 30:1 ratio, preferably a 1:5 to 20:1 ratio.

(F)

O-(2,4-dichlorophenyl)-O-methyl-isopropyl-phosphoramidothiate
2,3,5,6-tetrachloroterephthalic acid, dimethyl ester Mixed in a 1:4 to 20:1 ratio, preferably a 1:3 to 15:1 ratio.

(G) 2,4-dichloro-4'-nitrodiphenyl ether

Mixed in a 1:10 to 30:1 ratio, preferably a 1:5 to 20:1 ratio.

Other substituted uracils

The uracils of Formulae 1 through 3 can be mixed with other substituted uracils, in the proportions listed below. Methods for the preparation of the listed uracils can be found in copending applications Serial Nos. 233,952, filed October 29, 1962; 241,141, filed November 30, 1962; 221,890, filed September 6, 1962; 232,311, filed October 22, 1962; and 217,521, filed August 17, 1962.

(A)

3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil Mixed in a 1:4 to 4:1 ratio, preferably a 1:2 to 2:1 ratio.

(B)

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 ratio, preferably a 1:4 to 4:1 ratio.

(C)

3-cyclohexyl-5-bromouracil
3-cyclohexyl-5-chlorouracil
3-isopropyl-5-bromouracil
3-sec-butyl-5-bromouracil
3-sec-butyl-5-chlorouracil Mixed in a 1:6 to 6:1 ratio, preferably a 1:2 to 2:1 ratio.

(D)

3-isopropyl-1-trichloromethylthio-5-bromo-6-methyl-uracil
3-cyclohexyl-1-trichloromethylthio-5-bromo-6-methyl-uracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyl uracil Mixed in a 1:4 to 4:1 ratio, preferably a 1:2 to 2:1 ratio.

(E)

3-isopropyl-5-bromo-6-methyluracil
3-isopropyl-5-chloro-6-methyluracil
3-sec-butyl-5-bromo-6-methyluracil
3-sec-butyl-5-chloro-6-methyluracil
3-cyclohexyl-5-bromo-6-methyluracil
3-cyclohexyl-5-chloro-6-methyluracil
3-tert-butyl-5-bromo-6-methyluracil
3-tert-butyl-5-chloro-6-methyluracil Mixed in a 1:4 to 4:1 ratio, preferably a 1:2 to 2:1 ratio.

All of the foregoing ratios are weight ratios.

EXAMPLES

In order that the invention may be better understood, the following examples are given:

Preparation of compounds

EXAMPLE 1.—PREPARATION OF 3-BUTYL-6-METHYLURACIL

A solution of 100 parts by weight of xylene and 19.8 parts by weight of butyl isocyanate was added to a solution of 23 parts by weight of methyl 3-aminocrotonate in 100 parts by weight of xylene. The resulting mixture was stirred at reflux for one hour, chilled, filtered, and the filtrate distilled to remove the xylene.

The viscous liquid residue was diluted with 260 parts by weight of 95% ethyl alcohol and 320 parts by weight of 8% aqueous sodium hydroxide solution. This mixture was stirred and refluxed for 10 minutes, then cooled to about 50° C. and sufficient concentrated hydrochloric acid was added to make the reaction slightly acidic.

After the alcohol was removed from the reaction mass by distillation, the remaining aqueous filtrate was chilled, causing solid 3-butyl-6-methyluracil to separate.

After recrystallization from ethanol, it melted at 182–183° C.

The following compounds of this invention can be similarly prepared by substituting equivalent amounts of the amines and isocyanates set forth in the following list for the methyl 3-aminocrotonate and butyl isocyanate:

| Amine | Parts by Weight | Isocyanate | Parts by Weight | Uracil Product |
|---|---|---|---|---|
| Methyl 3-aminocrotonate. | 23 | Hexyl isocyanate. | 25.8 | 3-hexyl-6-methyluracil. |
| Do | 23 | Propyl isocyanate. | 17 | 3-propyl-6-methyluracil. |
| Methyl 3-amino-3-ethylacrylate. | 25.8 | Butyl isocyanate. | 19.8 | 3-butyl-6-ethyluracil. |
| Methyl 3-amino-3-butylacrylate. | 31.4 | Amyl isocyanate. | 22.6 | 3-amyl-6-butyluracil. |

EXAMPLE 2.—PREPARATION OF 3-ISOPROPYL-6-METHYLURACIL

A mixture of 51 parts of isopropylurea, 65 parts of ethyl acetoacetate, and 2.5 parts of polyphosphoric acid in 250 parts of benzene is heated at reflux for 10 hours during which time 8 parts of water is collected in a trap.

The solution is decanted and evaporated to a solvent-free residue which is taken up in 250 parts of ethanol containing 26.5 parts of sodium methoxide. This mixture is heated at reflux for 10 minutes, then again evaporated to a solvent-free residue and taken up in 500 parts of water. The water solution is washed with ether and acidified with concentrated hydrochloric acid, whereupon 3-isopropyl-6-methyluracil separates as a white crystalline solid having a melting point of 186–187° C.

The compounds in the following list can be similarly prepared by substituting equivalent amounts of the listed β-keto esters and ureas for the ethyl acetoacetate and isopropylurea:

| β-Keto Ester | Parts by Weight | Urea | Parts by Weight | Uracil Product |
|---|---|---|---|---|
| Ethyl 3-keto-nonanoate. | 100 | Tert-butyl-urea. | 58 | 3-tert-butyl-6-hexyluracil. |
| Ethyl acetoacetate | 65 | Sec-butyl-urea. | 58 | 3-sec-butyl-6-methyluracil. |
| Do | 65 | Isopropyl-thiourea. | 59 | 3-isopropyl-6-methyl-2-thio-uracil. |
| Do | 65 | Amylurea | 65 | 3-amyl-6-methyluracil. |
| Ethyl 3-keto-hexanoate. | 79 | Isoamyl-thiourea. | 73 | 3-isoamyl-6-propyl-2-thio-uracil. |
| Ethyl acetoacetate | 65 | Isobutyl-urea. | 58 | 3-isobutyl-6-methyluracil. |
| Do | 65 | Tert-butyl-urea. | 58 | 3-tert-butyl-6-methyluracil. |
| Do | 65 | 1,3-dimethylbutyl-urea. | 72 | 3-(1,3-dimethylbutyl)-6-methyluracil. |

EXAMPLE 3.—PREPARATION OF 3-BUTYL-6-METHYLURACIL, SODIUM SALT 18.2 parts of 3-butyl-6-methyluracil are dissolved in a solution of 4 parts of sodium hydroxide in 100 parts of water. The water is then removed from the solution under reduced pressure, leaving 3-butyl-6-methyluracil, sodium salt as a white solid.

The alkali metal and alkaline earth metal salts of the uracil products set forth in Examples 1 and 2 can be similarly prepared by substituting equivalent amounts of them and an appropriate hydroxide for the 3-butyl-6-methyluracil and sodium hydroxide.

EXAMPLE 4.—PREPARATION OF 1:1 COMPLEX OF 3-TERT-BUTYL-6-METHYLURACIL AND PENTACHLOROPHENOL

A mixture of 182 parts of 3-tert-butyl-6-methyluracil, 266 parts of pentachlorophenol and 1250 parts of cyclohexane is stirred at reflux as 50 parts of nitromethane are gradually added. The physical appearance of the solid changes rapidly. When no further change is noticed, the mixture is chilled and the solid product is filtered off and recrystallized from nitromethane.

The following complexes can be prepared in a similar fashion by substituting equivalent amounts of the proper phenol and uracil for the 3-tert-butyl-6-methyluracil and pentachlorophenol:

1:1 complex pentachlorophenol and 3-sec-butyl-6-methyluracil
1:1 complex pentachlorophenol and 3-tert-butyl-6-ethyluracil
1:1 complex pentachlorophenol and 3-(2-methylbutyl)-6-propyluracil
1:1 complex m-methylphenol and 3-(2-hexyl)-6-methyluracil

EXAMPLE 5.—PREPARATION OF 2:1 COMPLEX OF 3-ISOPROPYL-6-ETHYLURACIL AND PHENOL

A dry mixture of 182 parts of 3-isopropyl-6-ethyluracil and 47 parts of phenol is gradually heated until a clear melt is formed. This is stirred for a short time to insure complex formation, and then cooled. The resulting solid cake is sufficiently pure for incorporation into herbicidal formulations.

The following complexes can be formed by substituting molecularly equivalent quantities of the appropriate phenols for phenol, and the appropriate uracils for 3-isopropyl-6-ethyluracil:

1:2 complex p-chlorophenol and 3-(3-hexyl)-6-methyluracil
1:2 complex p-nitrophenol and 3-(2-pentyl)-6-methyluracil
1:2 complex p-methoxyphenol and 3-butyl-6-ethyluracil EXAMPLE 6.—PREPARATION OF THE ETHANOLAMINE ADDITION COMPOUND OF 3-ISOPROPYL-6-METHYLURACIL A solution is prepared by mixing together 182 parts of 3-tert-butyl-6-methyluracil, 392 parts of acetonitrile and 61 parts of ethanolamine. The solvent is distilled off at reduced pressure and the oil which remains gradually solidifies. The molar addition compound is recrystallized from nitromethane.

The following addition compounds can be prepared according to this procedure by substituting molar equivalents of a properly substituted uracil and an appropriate amine for 3-tert-butyl-6-methyluracil and ethanolamine:

3-butyl-6-methyluracil·ethanolamine addition compound
3-(2-pentyl)-6-ethyluracil·ethanolamine addition compound
3-tert-butyl-6-hexyluracil·ethylenediamine addition compound
3 - neopentyl - 6 - ethyluracil·dodecylamine addition compound

EXAMPLE 7.—PREPARATION OF THE TETRABUTYLAMMONIUM SALT OF 3-BUTYL-6-METHYLURACIL

A total of 182 parts of 3-butyl-6-methyluracil is gradually added, with stirring, to 1000 parts of a one-molar solution of tetrabutylammonium hydroxide in methanol. When solution is complete, the solvent is distilled off at reduced pressure. The white solid tetrabutylammonium salt of 3-butyl-6-methyluracil which remains is sufficiently pure for incorporation into herbicidal formulations.

The following tetraalkylammonium salts can be similarly prepared by substituting molar equivalent amounts of a properly substituted uracil and an appropriate quaternary ammonium hydroxide for 3-butyl-6-methyluracil and tetrabutylammonium hydroxide:

Tetramethylammonium salt of 3-hexyl-6-isopropyluracil
Tetramethylammonium salt of 3-sec-butyl-6-methyluracil
Tetramethylammonium salt of 3-sec-butyl-6-ethyl-2-thiouracil
Tetramethylammonium salt of 3-pentyl-6-methyluracil
Tetramethylammonium salt of 3-(2-methylpropyl)-6-methyluracil
Trimethyldodecylammonium salt of 3-hexyl-6-methyluracil
Trimethyldodecylammonium salt of 3,6-dibutyluracil

PREPARATION AND USE OF HERBICIDAL COMPOSITIONS

*Aqueous preparations*

EXAMPLE 8

A solution is prepared by mixing these components:

| | Percent |
|---|---|
| 3-butyl-6-methyluracil, Na salt | 10 |
| Sodium dodecyl benzene sulfonate | 2 |
| Water | 88 |

When applied to a field of cotton at a concentration of 2.0 pounds of active ingredient per acre, this solution gives good control of annual broadleaf and grass weeds without injury to the crop.

Applied at rates of 20 to 35 pounds of active ingredient per acre, the solution gives excellent control of goldenrod, ox-eye daisy, quackgrass, broom sedge, and orchardgrass growing along fence rows and around refinery oil tanks.

Other water-soluble salts which can be similarly formulated are:

3-isopropyl-6-methyluracil, tetramethylammonium salt
3-propyl-6-ethyluracil, potassium salt These salts, prepared as solutions and applied at 6 to 10 pounds (active) per acre in 100 gallons of water, give good control of germinating crabgrass, watergrass, and ragweed growing along boardwalks.

EXAMPLE 9

A water suspension is prepared by blending the following dry ingredients in a ribbon blender and then grinding them with water in a ball or roller mill until the solids are finely dispersed in the water and the average particle size is less than 5 microns:

| | Percent |
|---|---|
| 3-isopropyl-6-methyl-2-thiouracil | 25 |
| Hydrated attapulgite | 2 |
| Lignin sulfonic acids, Na salt | 5 |
| Water | 68 |

EXAMPLE 10

A water suspension is prepared by blending the following dry ingredients in a ribbon blender and then grinding with water in a sand-mill:

| | Percent |
|---|---|
| 3-butyl-6-propyl-2-thiouracil | 25 |
| Hydrated attapulgite | 2 |
| $Na_2HPO_4$ | 1 |
| Lignin sulfonic acid, Na salt | 5 |
| Sodium pentachlorophenate | 0.5 |
| Water | 66.5 |

Grinding is continued until essentially all the particles in the suspension have been reduced to diameters of less than 5 microns.

The compositions of Examples 9 and 10 are useful for pre-emergence weed control in soybeans and sorghum. When applied at a concentration of 2.5 pounds of active ingredient per acre, excellent control of crabgrass, foxtail, flower-of-an-hour, and velvet leaf is obtained, with no observable injury to the crops.

Oil preparations

EXAMPLE 11

An oil suspension is prepared by grinding the following ingredients in a ball or roller mill until the solids are finely dispersed in the oil and the average particle size is less than 5 microns:

| | Percent |
|---|---|
| 3-butyl-6-methyl-2-thiouracil | 25 |
| Diesel oil | 67 |
| Alkyl aryl polyether alcohol | 8 |

EXAMPLE 12

An oil suspension is prepared by grinding the following ingredients together in a ball or roller mill until the solids are finely dispersed in the oil and the average particle size of the active ingredient is less than 5 microns:

| | Percent |
|---|---|
| 3-hexyl-6-methyluracil | 25 |
| Diesel oil | 67 |
| Polyoxy ethylene sorbitan ester of mixed rosin and fatty acids | 8 |

This oil suspension can be diluted with water to form a water emulsion.

EXAMPLE 13

| | Percent |
|---|---|
| 3-propyl-6-hexyluracil | 15 |
| No. 2 fuel oil | 80 |
| Polyoxyethylene sorbitan ester of mixed rosin and fatty acids | 5 |

These ingredients are ground together in a sand-mill until the solids are finely dispersed in the oil and the average particle size of the active ingredient is less than 5 microns.

This oil suspension is diluted with water to form a water emulsion for application to plants.

The oil suspensions of Examples 11, 12 and 13 are useful for controlling weed growth in railroad yards and sidings. When these compositions are diluted with water and sprayed at concentrations of about 35 pounds of active ingredient per acre, such weeds as quackgrass, crabgrass, Johnson grass, Bermuda grass, brome grass, ragweed, cocklebur, lamb's-quarter, and mare's-tail are controlled for extended periods.

Granules

EXAMPLE 14

| | Percent |
|---|---|
| 3-butyl-6-methyluracil, Na salt | 2 |
| 15–30 mesh vermiculite | 98 |

The active material is dissolved in water and sprayed upon the vermiculite while it is being tumbled. The product is then dried.

The resulting granules are useful for pre-emergence weed control in crops. When applied at a concentration of 2.5 pounds of active ingredient per acre, excellent control of crabgrass, giant foxtail, pigweed, lamb's-quarter, and ragweed growing in peanuts is obtained without noticeable injury to the crop.

EXAMPLE 15

| | Percent |
|---|---|
| 3,6-dibutyluracil | 20 |
| Attapulgite clay | 78 |
| Alkyl naphthalene sulfonic acid, Na salt | 1 |
| Lignin sulfonic acid, Na salt | 1 |

These ingredients are mixed in a ribbon blender until homogeneous and then charged to a pug mill where sufficient water is blended in to form a thick paste. The paste is extruded from the pug mill. These extrusions are dried and then broken by a rotary crusher into irregular granules about ¼" to ⅛" in diameter.

EXAMPLE 16

| | Percent |
|---|---|
| 3,6-diisopropyluracil | 12 |
| Sand (20–30 mesh) | 81 |
| Sodium silicate (28% $SiO_2$; ratio $SiO_2/Na_2O=3.25$ | 7 |

The sand and sodium silicate solution are mixed in a ribbon blender until the sand is completely wet. The active ingredient is then dusted into the mixture as it is being agitated. The granules are then discharged from the belnder and dried.

EXAMPLE 17

| | Percent |
|---|---|
| 3-isoamyl-6-propyl-2-thiouracil, Na salt | 5 |
| Granular 15–30 mesh attapulgite | 95 |

The active material is dissolved in water and sprayed on the attapulgite while it is being tumbled. The product is then dried.

EXAMPLE 18

| | Percent |
|---|---|
| 3-amyl-6-methyluracil | 10 |
| 6–15 mesh expanded vermiculite | 90 |

A granular preparation is made by dissolving the active ingredient in methylisobutylketone, spraying it on the vermiculite, and then drying the product.

The granule preparation of Examples 15, 16, 17 and 18 can be applied by hand or by a commercial spreader. They control weeds around industrial sites, lumber yards, boundary fences, railroad rights-of-way, billboards, parking areas, and roadsides.

They can also be used as spot treatments to soil for control of woody plants such as turkey oak, winged elms, and mesquite.

When applied at concentration of 29–80 pounds per acre of active ingredient, they also control germinating annual weeds, established perennial weeds such as quackgrass and Johnson grass and woody plants.

Pellets

EXAMPLE 19

| | Percent |
|---|---|
| 3-(1,3-dimethylbutyl)-6-methyluracil | 25 |
| Alkyl naphthalene sulfonic acid, Na salt | 1 |
| Anhydrous sodium sulfate | 10 |
| Non-swelling clay | 64 |

These components are bleneded and micropulverized, then mixed with 15–20% of water and extruded under pressure through an orifice to produce rods which are then cut into pellets and dried.

EXAMPLE 20

| | Percent |
|---|---|
| 3-propyl-6-ethyluracil | 25 |
| Sodium sulfate anhydrous | 10 |
| Sodium lignin sulfonate | 10 |
| Ca, Mg bentonite | 55 |

These components are blended, micropulverized, moistened with 16–18% water, and extruded as ⅛"-diameter cylinders. The cylinders are cut as they are extruded to give ⅛ x ⅛" pellets, which are then dried.

EXAMPLE 21

| | Percent |
|---|---|
| 3-isoamyl-6-methyluracil | 12 |
| Polyvinyl alcohol (low viscosity) | 2 |
| Water | 16 |
| Prilled sodium nitrate (2–4 mesh) | 70 |

The active ingredient is first ball milled with the polyvinyl alcohol and water to form a thin paste, which is then added slowly to a ribbon blender agitating the prilled sodium nitrate. Steam heat can be applied to a jacket on the ribbon blender to hasten the drying. Blending and drying are continued until the coating is firmly adherent.

EXAMPLE 22

| | Percent |
|---|---|
| 3-amyl-6-butyluracil | 40 |
| Alkyl naphthalene sulfonate, Na salt | 1 |
| Anhydrous sodium sulfate | 5 |
| Calcium, Mg bentonite | 54 |

These components are dry blended, micropulverized, moistened, and extruded. The extrusions are cut into pellets and dried.

The pellet compositions of Examples 19, 20, 21 and 22 can be used, at rates of about 30–35 pounds of active per acre, for weed control along highway guard rails, bridge abutments, safety fences, and highway signs.

EXAMPLE 23

| | Percent |
|---|---|
| 3-sec-amyl-6-methyluracil | 14.8 |
| Water | 21.70 |
| Hide glue (20% aqueous) | 5.00 |
| Glass frits (20–30 mesh) | 58.50 |

The active ingredient is first made into an aqueous suspension by ball milling it with the water and hide glue. This aqueous susepnsion is then sprayed on the glass frits with continuous agitation in a ribbon blender. When complete coverage is obtained, the frits are removed and and dried in a tunnel drier.

Wettable powders

EXAMPLE 24

| | Percent |
|---|---|
| 3-butyl-6-methyluracil | 80.00 |
| Attapulgite clay | 18.25 |
| Alkyl naphthalene sulfonic acid, Na salt | 1.50 |
| Low viscosity methylcellulose | 0.25 |

These components are blended in a ribbon blender, micropulverized in a hammer mill until the particles are under 50 microns in diameter and then reblended until the powder is homogeneous.

The ingredients in the following list can be prepared as a wettable powder in the same manner:

(A)

| | Percent |
|---|---|
| 3-propyl-6-methyluracil, Mg salt | 80.00 |
| Alkyl naphthalene sulfonate, Na salt | 1.75 |
| Sodium lignin sulfonate | 1.00 |
| Kaolin | 17.25 |

(B)

| | Percent |
|---|---|
| 3-butyl-6-ethyluracil, Ca salt | 80.00 |
| Sodium diamyl sulfosuccinate | 0.4 |
| Ditertiary acetylenic glycol | 0.4 |
| Oleyl ester of sodium isethionate | 1.0 |
| Kaolin clay | 18.2 |

EXAMPLE 25

| | Percent |
|---|---|
| 3-amyl-6-ethyluracil | 25 |
| Kaolin clay | 73 |
| Dioctyl ester of sodium sulfosuccinic acid | 1 |
| Sodium lignin sulfonate | 1 |

These components are blended in a ribbon blender, micropulverized in a hammer mill until the particles are under 50 microns in diameter, and then reblended until homogeneous.

EXAMPLE 26

| | Percent |
|---|---|
| 3-isobutyl-6-methyluracil | 50.00 |
| Synthetic precipitated hydrated silicon dioxide | 48.10 |
| Low viscosity methylcellulose | 0.40 |
| Alkyl naphthalene sulfonic acid, Na salt | 1.50 |

These components are blended in a ribbon blender, then micropulverized in a hammer mill. This product is then air reductionized until the particles are under 10 microns in diameter, and is then reblended until homogeneous.

EXAMPLE 27

A wettable powder is made by blending the following ingredients in a ribbon blender:

| | Percent |
|---|---|
| 3-propyl-6-amyluracil | 50 |
| Diatomite | 46 |
| Polymerized sodium salts of alkyl naphthalene sulfonic acid | 2 |
| Glyceryl monostearate | 2 |

After blending, the composition is micropulverized in a hammer mill until the particles are less than 50 microns in diameter, and is then reblended in a ribbon blender until homogeneous.

EXAMPLE 28

| | Percent |
|---|---|
| 3-isoamyl-6-butyluracil | 60 |
| Synthetic calcium silicate | 38 |
| Polyvinyl alcohol (low viscosity) | 1 |
| Alkyl naphthalene sulfonic acid, Na salt | 1 |

These components are blended in a ribbon blender, micropulverized in a hammer mill until the particles are under 50 microns in diameter and then reblended in a ribbon blender until homogeneous.

EXAMPLE 29

A wettable powder is prepared by blending the following ingredients in a ribbon blender:

| | Percent |
|---|---|
| 3-propyl-6-butyluracil | 70.00 |
| Attapulgite clay | 28.25 |
| Alkyl naphthalene sulfonic acid, Na salt | 1.50 |
| Low viscosity methylcellulose | 0.25 |

The blended mixture is micropulverized in a hammer mill until the particles are under 50 microns in diameter and then remixed in a ribbon blender until homogeneous.

EXAMPLE 30

| | Percent |
|---|---|
| 3-hexyl-6-butyluracil | 50 |
| Kaolin clay | 48 |
| Dioctyl ester of sodium sulfosuccinic acid | 1 |
| Sodium lignin sulfonate | 1 |

These ingredients are mixed in a ribbon blender, micropulverized in a hammer mill until the particles are less than 50 microns in diameter, and then remixed in a ribbon blender until homogeneous.

EXAMPLE 31

A wettable powder is prepared by blending the following ingredients in a ribbon blender:

| | Percent |
|---|---|
| 3-isopropyl-6-methyluracil | 60.00 |
| Attapulgite clay | 38.25 |
| Alkyl naphthalene sulfonic acid, Na salt | 1.50 |
| Low viscosity methylcellulose | 0.25 |

The blended mixture is ground in a hammer mill until the particles have diameters of less than 50 microns, and is then reblended until homogeneous.

EXAMPLE 32

A wettable powder formulation is prepared by blending the following components in a ribbon blender:

| | Percent |
|---|---|
| 3-butyl-6-ethyluracil | 50 |
| Kaolin clay | 48 |
| Dioctyl ester of sodium sulfosuccinic acid | 1 |
| Sodium lignin sulfonate | 1 |

The blended mixture is ground in a hammer mill until the particles are less than 50 microns in diameter. The mixture is then reblended until homogeneous.

The wettable powder compositions of Examples 24–32 can be used for pre-emergence application in agricultural crops such as cotton, sugarcane and soybeans. When dispersed in 80 gallons of water and applied at a concentration of 1–4 pounds of active ingredient per acre (as formulated), excellent control of such germinating broadleaf and grass weeds as pigweed, lambs quarter, purslane, mustard, crabgrass and foxtail, is obtained, with no observable injury to the crops.

EXAMPLE 33

|  | Percent |
|---|---|
| 3-tert-butyl-6-methyluracil-2:1 complex with p-chlorophenol | 75.0 |
| Sodium lauryl sulfate | 0.6 |
| Sodium lignin sulfonate | 2.0 |
| Calcined montmorillonite clay (Pikes Peak clay) | 22.4 |

These ingredients are blended and micropulverized until the complex particles are below 50 microns in diameter. The mixture is then reblended.

This wettable powder is useful for weed control on railroad rights-of-way, sidings, and yards. When diluted with 100 gallons of water and sprayed at the rate of 80 pounds of active ingredient per acre, watergrass crabgrass, needle grass, brome grass, ragweed, cocklebur, and lamb's-quarter are controlled.

The following uracil complexes can be substituted, in equivalent amounts, for 3-tert-butyl-6-methyluracil 2:1 complex with p-chlorophenol, with similar results:

1:2 complex phenol and 3-sec-butyl-6-methyl-2-thiouracil
1:2 complex phenol and 3-tert-butyl-6-methyluracil
1:1 complex pentachlorophenol and 3-sec-butyl-6-ethyluracil
1:1 complex pentachlorophenol and 3-(3-hexyl)-6-propyluracil
1:1 complex p-chlorophenol and 3-isopentyl-6-methyluracil

EXAMPLE 34

A wettable powder is prepared by blending the following components in a ribbon blender and micropulverizing them until the particles are below 50 microns in diameter. The mixture is then reblended until homogeneous.

|  | Percent |
|---|---|
| 1:1 addition compound of 3-butyl-6-methyluracil with octylamine | 25 |
| Attapulgite clay | 70 |
| Dioctyl ester of sodium sulfosuccinate | 1 |
| Sodium lignin sulfonate | 4 |

This wettable powder is dispersed in 60 gallons of water and applied at the rate of 30 pounds of active ingredient per acre on an unsurfaced parking lot. Volunteer small grains, crabgrass, ryegrass, wild mustard, chickweed, and dandelion are controlled.

The following uracil addition compounds can be substituted, in equivalent amounts, for the 1:1 addition compound of 3-butyl-6-methyluracil with octylamine, with similar results:

3-butyl-6-methyluracil·ethanolamine addition compound
3-tert-butyl-6-hexyluracil·ethylenediamine addition compound

EXAMPLE 35

|  | Percent |
|---|---|
| 3-tert-butyl-6-methyluracil | 40 |
| Sodium lauryl sulfate | 40 |
| Synthetic fine calcium silicate | 20 |

These components are blended and micropulverized until the uracil particles are under 50 microns in diameter.

This formulation is applied, in aqueous dispersion, at 10 pounds of active ingredient per acre, to grass and broadleaf weeds along an airport boundary fence. The vegetation is quickly killed and regrowth is prevented for the remainder of the growing season.

EXAMPLE 36

|  | Percent |
|---|---|
| 3-sec-butyl-6-methyluracil | 50.0 |
| Kaolin clay | 40.5 |
| Synthetic fine silica | 6.0 |
| Alkyl naphthalene sulfonic acid, Na salt | 1.5 |
| Partially desulfonated, sodium lignin sulfonate | 2.0 |

A wettable powder is prepared with these components by blending them in a ribbon blender, micropulverizing them until the particles are less than 50 microns in diameter, and then reblending.

This formulation is applied at 25 pounds of active ingredient per acre to a mixed growth of grass and broadleaf weeds around highway bridge abutments and guard rails. Excellent control of the weed growth is obtained during the summer season.

EXAMPLE 37

|  | Percent |
|---|---|
| Technical 3-butyl-6-methyluracil (95% active) | 53 |
| Potassium carbonate | 20 |
| Sodium silicate | 25 |
| Dioctyl ester of sodium sulfosuccinate | 0.5 |
| Synthetic fine silica | 1.5 |

The ingredients are blended and ground until a uniform powder is produced. Four pounds of this composition per acre are applied as a pre-emergence spray to corn and weed seeds planted in loam soil. Mustard, amaranthus, millet, ryegrass, and seedling Bermuda grass are killed. Corn planted 1½ inches deep is not injured and grows normally.

EXAMPLE 38

|  | Percent |
|---|---|
| 3-butyl-6-methyluracil, sodium salt | 90 |
| Allyl naphthalene sulfonate, sodium salt | 2 |
| Sodium silicate | 3 |
| Synthetic fine silica | 5 |

The ingredients are blended and ground until a homogeneous powder is obtained having particles less than 50 microns in diameter.

A pre-emergence spray treatment of soybeans, planted 1 inch deep, with 2 pounds of this composition per acre, gives 96% control of mixed annular grasses and broadleaves with no injury to the crop.

The embodiments of the invention in which an exclusive property or privilege is claimed are:

1. A method for the control of weeds, said method comprising applying to a locus to be protected a herbicidal amount of a compound selected from the group consisting of
   (a) compounds of the formula

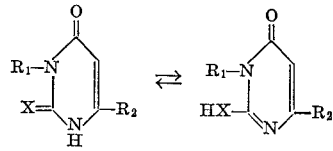

where
   $R_1$ is alkyl of 3 through 6 carbon atoms;
   $R_2$ is alkyl of 1 through 6 carbon atoms; and
   X is selected from the group consisting of oxygen and sulfur; and
   (b) the sodium, potassium, lithium, calcium, magnesium, barium, strontium, iron, manganese, and quaternary ammonium salts of the compounds in (a).

2. A method according to claim 1, wherein the compound is 3-sec-butyl-6-methyluracil.
3. A method according to claim 1, wherein the compound is 3-tert-butyl-6-methyluracil.
4. A method according to claim 1, wherein the compound is 3-isopropyl-6-methyluracil.
5. A method according to claim 1, wherein the compound is 3-(1,3-dimethylbutyl)-6-methyluracil.

6. A method according to claim 1, wherein the compound is 3-amyl-6-methyluracil.

7. A method according to claim 1, wherein the compound is 3-amyl-6-ethyluracil.

8. A method for the control of weeds, said method comprising applying to a locus to be protected a herbicidal amount of a compound selected from the group consisting of (a) compounds of the formula

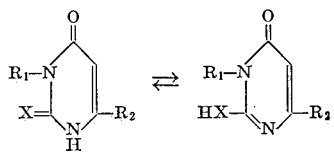

where
R₁ is alkyl of 3 through 6 carbon atoms;
R₂ is alkyl of 1 through 6 carbon atoms; and
X is selected from the group consisting of oxygen and sulfur; and (b) the sodium, potassium, lithium, calcium, magnesium, barium, strontium, iron, manganese, and quaternary ammonium salts of the compounds in (a);

(c) compounds of the formula

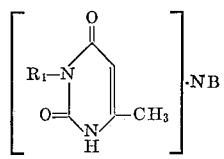

where
R₁ is defined as above, and
NB is a nitrogenous base having an ionization constant $K_b$ of $\cong 10^{-9}$ in water; and (d) compounds of the formula

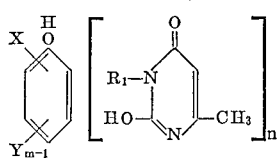

where
R₁ is defined as above;
X is selected from the group consisting of hydrogen, chlorine, nitro, alkyl of 1 through 3 carbon atoms, and bromine;
Y is selected from the group consisting of chlorine and alkyl of 1 through 3 carbon atoms;
$m$ is a number 1 through 5; and
$n$ is selected from the group consisting of 1 and 2.

References Cited by the Examiner
UNITED STATES PATENTS

| | | | |
|---|---|---|---|
| 2,567,651 | 9/1951 | Papesch et al. | 260—260 |
| 2,688,020 | 8/1954 | McKay et al. | 260—260 |
| 2,969,364 | 1/1961 | Lyttle | 71—2.5 X |
| 3,002,975 | 10/1961 | Slezak | 71—2.5 X |
| 3,078,154 | 2/1963 | Gysin et al. | 71—2.5 |
| 3,086,854 | 4/1963 | Harvey, Jr. | 71—2.5 |

OTHER REFERENCES

Bonner et al., Proc. Natl. Acad. Sci. 25, 184–188 (1939).

Thompson et al., Botanical Gazette, 107, 475–507 (1946).

LEWIS GOTTS, *Primary Examiner.*

JULIAN S. LEVITT, *Examiner.*